(12) United States Patent
Parry

(10) Patent No.: US 7,400,425 B2
(45) Date of Patent: Jul. 15, 2008

(54) SYSTEM AND METHOD FOR FACILITATING NETWORK PRINTING

(75) Inventor: Travis J. Parry, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1175 days.

(21) Appl. No.: 10/124,984

(22) Filed: Apr. 16, 2002

(65) Prior Publication Data
US 2003/0193687 A1 Oct. 16, 2003

(51) Int. Cl.
*G06F 15/00* (2006.01)
(52) U.S. Cl. ............ 358/1.15; 358/1.13; 709/203; 709/232; 709/237
(58) Field of Classification Search ........... 358/1.15, 358/1.13; 709/203, 232, 237
See application file for complete search history.

(56) References Cited

U.S. PATENT DOCUMENTS 6,636,891 B1 * 10/2003 LeClair et al. ............ 709/208
6,978,299 B1 * 12/2005 Lodwick .................. 709/223
2002/0001495 A1 * 1/2002 Mochizuki ................ 400/61
2002/0085224 A1 * 7/2002 Price et al. ............... 358/1.13
2002/0085228 A1 * 7/2002 Yagita ..................... 358/1.15
2002/0105671 A1 * 8/2002 Sugahara ................. 358/1.15

* cited by examiner

*Primary Examiner*—Edward L. Coles
*Assistant Examiner*—Chan S Park

(57) ABSTRACT

A system for facilitating remote printing via a network. The system, in one embodiment, includes a first mechanism for receiving information with respect to the availability to print of one or more printers connected to the network, for selecting an available printer in response thereto, and for providing a printer-selected message to the selected printer indicating that the printer has been selected to print the document. The system also includes a second mechanism, responsive to the printer-selected message, for rechecking the availability to print of the selected printer and for pulling the document from the first mechanism in preparation for printing via the selected printer unless the rechecking determines that the selected printer has subsequently become unavailable to print.

21 Claims, 4 Drawing Sheets

SYSTEM AND METHOD FOR FACILITATING NETWORK PRINTING

BACKGROUND OF THE INVENTION

1. Field of Invention

This invention relates to printing systems. Specifically, the present invention relates to systems and methods for facilitating remote printing via one or more devices, such as Internet appliances, and one or more printers connected to a network.

2. Description of the Related Art

Remote printing systems and methods are employed in various demanding applications including office computer network and home Internet appliance printing applications. Such applications often demand memory-efficient and versatile printing systems and software that can effectively print from plural network devices.

In an exemplary network-printing environment, one or more network devices, such as computers, hand-held devices, Internet appliances, and printers intercommunicate via a wireless and/or landline network. Devices connected to the network often print via one or more printers connected to the network. To print to a desired printer via a network device, the network device must run printer driver software specific to that desired printer. A document to be printed is sent to the desired printer, i.e., pushed via the driver software running on the network device. If other devices are currently printing to the same printer, the current print job is typically placed in a queue until previously pushed jobs are printed. If the desired printer is offline or malfunctioning, the user may waste time printing to the printer.

In a conventional network-printing environment, a device that prints to several different types of printers must have installed printer drivers for each type of printer. The printer drivers are often bulky software packages that occupy significant device memory. Consequently, some devices may not have sufficient memory to enable printing to various types of printers without first removing other software from memory to accommodate the additional printer driver(s). This is particularly problematic in hand-held devices and Internet appliances, where available memory is often severely limited.

To overcome driver storage issues, companies such as Lexmark, NEC, and Peerless Technology, have developed various remote Internet based printing systems. In these systems, a user employing a device with a document to print browses to a printer interface website or other service via the device. The user then pushes, i.e., transfers the desired document to the printer interface website or directly to a selected printer via the device. Translation of the document into appropriate printer control commands is performed via drivers running on the printer interface website or running directly on the printer. The user typically must know the printer type, the electronic address of the printer interface website or service, the name of the website or service, and/or the name of the desired printer. Unfortunately, users often lack this information, and obtaining it may be undesirably time consuming. This is particularly problematic when traveling, where users may lack information about the local network printers.

Hence, a need exists in the art for an efficient system and method that enables devices connected to a network to print to various types of printers without requiring installation of several different bulky printer drivers on each device for each type of printer being employed. There exists a further need for a system and method that enables a user to efficiently obtain information about printers on a given network, such as whether the printers are available to print.

SUMMARY OF THE INVENTION

The need in the art is addressed by the system for facilitating remote printing via a network of the present invention. The system includes a first mechanism for receiving information with respect to the presence of one or more printers connected to the network and selecting an available printer in response thereto. A second mechanism pulls the document from the first mechanism in preparation for printing via the available printer.

In the illustrative embodiment, the inventive printing system is adapted for use with Internet appliances and handheld computers. In a specific embodiment, the first mechanism includes a first software module implemented via a client running on the device. The first software module generates a print broadcast to the one or more printers and includes a second software module for responding to the print broadcast via an availability message that indicates the availability status of the one or more printers. The second mechanism includes is adapted to receive the availability message and provide a list of available printers in response thereto. The second mechanism further includes a mechanism for selecting a printer from the available printers based on predetermined selection criteria and providing a selection message to the selected printer in response thereto.

In the illustrative environment, the second software module is installed on an intermediate device connected to the network or is installed on each of the one or more printers. The third mechanism is implemented via a third software module. The third software module is either installed on an intermediate device connected to the network or on each of the one or more printers. The third software module includes a mechanism for requesting the document from the first mechanism in response to the selection message.

The novel design of the present invention is facilitated by the operation of the third mechanism by which a document to be printed is pulled from its source. By pulling rather than pushing the document, various heretofore unforeseen benefits are obtained. In particular, only available printers are able to pull documents to be printed. This prevents devices from printing to offline printers. Furthermore, printer drivers are more readily implemented directly on the printers or intermediate devices, such as websites, rather than directly on the Internet appliances and handheld computers where device memory is limited. The present invention eliminates the need to install print drivers on clients that need to print. In addition, by implementing messaging between network devices and printers in accordance with the teachings of the present invention, users may efficiently obtain information about printers on a given network without a priori knowledge of the printers.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
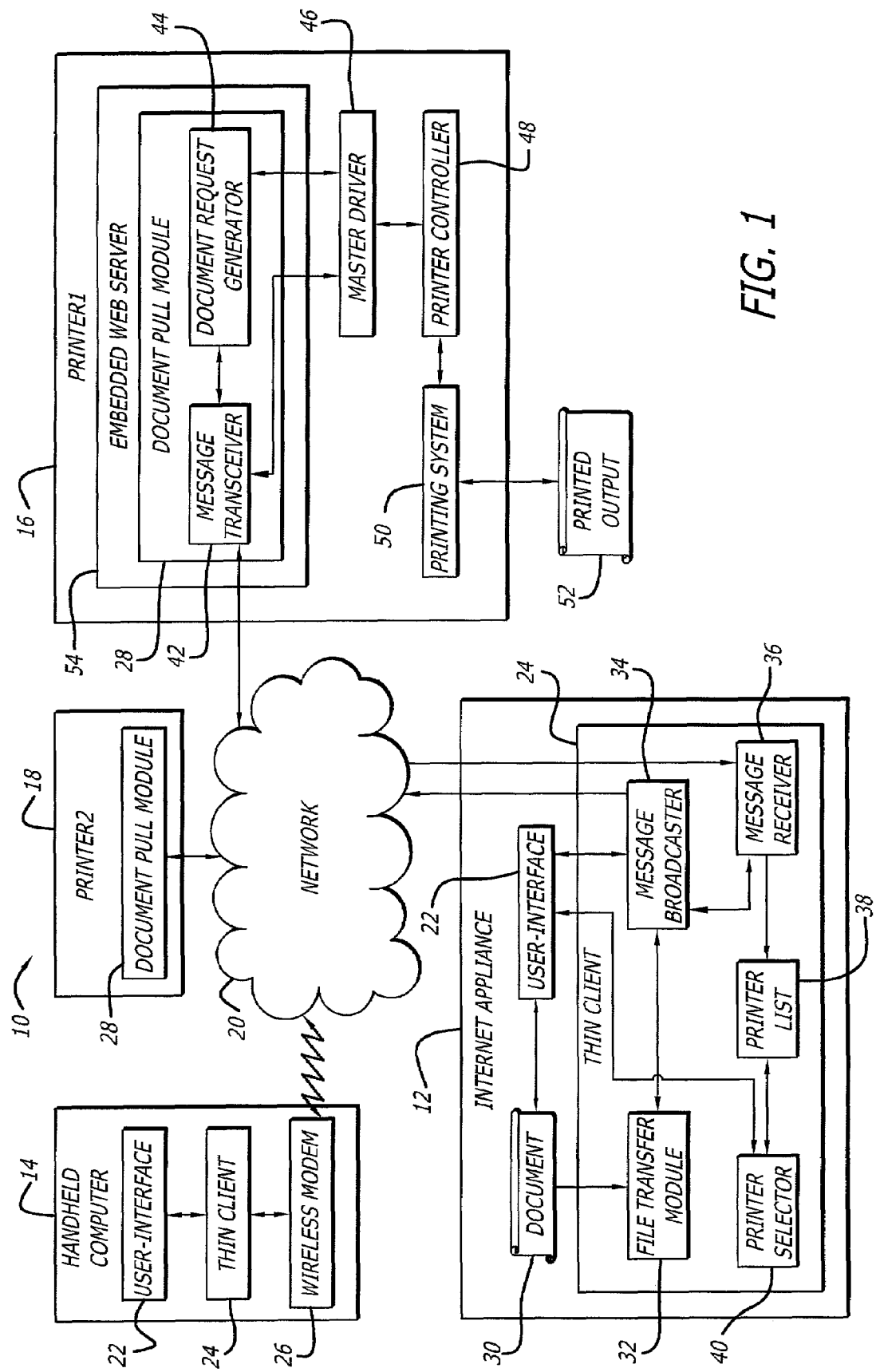
FIG. 1 is a diagram of a first exemplary network printing system constructed in accordance with the teachings of the present invention that includes components installed on devices and printers connected to a common network.

FIG. 1 is a diagram of a first exemplary network printing system 10 constructed in accordance with the teachings of the present invention that includes components installed on devices and printers connected to a common network 20. For clarity, various well-known components, such as computer operating systems, power supplies, processors, and so on, have been omitted from FIGS. 1 and 2, however those skilled in the art with access to the present teachings will know which components to implement and how to implement them to meet the needs of a given application.

In the present embodiment, the devices connected to the network 20 include an Internet appliance 12 and a handheld computer 14. The printers connected to the network include a first printer 16 and a second printer 18. The handheld computer 14 includes a user-interface 22 that communicates with a thin client 24. The thin client 24 is wirelessly connected to the network 20 via a wireless modem 26. The second printer 18 includes a document pull module 28 that may communicate with the thin client 24 via the network 20.

For the purposes of the present discussion, a 'thin client' is any computer or software package whose capabilities are limited to those required for a given implementation or application and that is adapted to communicate via a network with another computer, such as a server, from which files and data are received. In many applications, the thin client 24 will be implemented as low-cost communications module, such as a browser, devoid of compact disk controllers, printer drivers, or other software not required by the present invention. In these applications, the thin client 24 is 'thin' since it includes only those capabilities and functionality essential to a given application or implementation of the present invention. Those skilled in the art will appreciate that the thin client 24 may be implemented as any software or hardware module that can communicate over a network via a modem or other network connection without departing from the scope of the present invention. For example, the thin client 24 may be implemented as a full-featured server or browser complete with plug-ins and other modules that are not required for the purposes of the present invention without departing from the scope thereof.

The handheld computer 14 and the second printer 18 are shown for illustrative purposes. The thin client 24 running on the handheld computer 14 is shown in more detail running on the Internet appliance 12. The document pull module 28 running on the second printer 18 is shown in more detail running on the first printer 16.

The user-interface 22 running on the Internet appliance 12 may selectively access a document 30 to be printed and may access a printer selector module 40 and a message broadcaster 34 running on the thin client 24. The thin client 24 also includes a file transfer module 32 that may access memory associated with the document 30. The file transfer module 32 also communicates with the message broadcaster 34. The message broadcaster 34 communicates with a message receiver 36. The message receiver 36 provides output to a printer list 38, which is accessible by the printer selector 40. The printer selector 40 is user-configurable via the user-interface 22.

The first printer 16 includes an embedded web server 54 that runs the document pull module 28. The document pull module 28 includes a message transceiver 42 and a document request generator 44. The message transceiver 42 is connected to the network 20 and communicates with the document request generator 44 and a master driver 46 running on the first printer 16. The master printer driver 46 also communicates with the document request generator 44 and a printer controller 48. The printer controller 48 communicates with a printing system 50 that includes mechanical and electrical components required to provide printed output 52.

In operation, the handheld computer 14 prints a document via the first printer 16 or the second printer 18. The user sends a print command to the thin client 24 via the user interface 22. The thin client 24 then broadcasts a printer-querying message via the wireless modem 26 and the network 20, to the printers 16 and 18 that are connected to the network 20. The document pull module 28 running on each printer 16 and 18 then broadcasts a printer-availability reply message in response to the printer-querying message. The printer-availability reply message indicates that associated printer 16 or 18 is available to print. The user selects, via the user-interface 22 and/or the thin client 24, from among the available printers in the printer list 38 that have sent printer-availability reply messages. Alternatively, the thin client 24 automatically selects an available printer in response to a predetermined configuration as discussed more fully below.

When an available printer has been selected via the handheld computer 14, a printer-selected message is sent to the selected printer. The associated document pull module 28 then sends a request-for-document message to the thin client 24 to pull the document from the client to print the document. The thin client 24 then transfers the requested document to the selected printer via one of various network file transfer methods, such as HTTP (Hypertext Transfer Protocol) post or FTP (File Transfer Protocol) methods. The selected printer then prints the desired document.

Printing operations implemented via the Internet appliance 12 are similar to printing operations implemented via the handheld computer 14. When a user of the Internet appliance 12 decides to print the document 30, the user activates the message broadcaster 34 of the thin client 24 via the user-interface 22. The message broadcaster 34 generates the printer-querying message, which is broadcast to the first printer 16 and the second printer 18. The message receiver is activated 36 in response to an activation signal from the message broadcaster 34 or is always active when the Internet appliance 12 is connected to the network 20.

The document pull modules 28 running on the first printer 16 and the second printer 18 respond to the printer-querying message from the Internet appliance 12 with a printer-availability reply message. The printer-availability reply message is generated by the document request generator 44 and forwarded to the Internet appliance 12 via the message transceiver 42 and the network 20. The printer-availability reply message includes printer status information, such as the number of printers in the current print queue. The document request generator 44 communicates with the master driver 46 and the printer controller 48 to obtain the printer status information for incorporation into the printer-availability reply message.

The message receiver 36 runs on the thin client 24 of the Internet appliance 12 and receives printer-availability reply messages from available (online) printers 16 and 18 that are connected to the network 20. The message receiver 36 builds the printer list 38 based on the printer-availability reply messages. The printer list 38 is a list of all printers 16, 18 responding to the printer-querying message with a printer-availability reply message.

The printer selector 40 then selects the most desirable printer from the printer list 38 based on predetermined selection criteria. The predetermined selection criteria and associated selection process may be configured via the user-interface 22. The predetermined selection criteria may depend on printer availability status, printer type, printer location, and other information, which may be encoded in the printer-availability reply message or obtained via other mechanisms (not shown). The other mechanisms may include printer databases having records that may be selectively accessed based on header codes received via the printer-availability reply messages.

Assume that the first printer 16 is selected as the desired printer via the printer selector 40 and/or the user. Software associated with the user-interface 22 then forwards a printer-selected message to the selected printer 16 indicating that the printer 16 has been selected to print a the document 30. If the selected printer 16 is still able to accommodate the document as determined by the document request generator 44 with reference to printer availability information from the master driver 46, the document request generator 44 generates a request-for-document message. The request-for-document message is then forwarded to the Internet appliance 12 and received by the message receiver 36 before being forwarded to the user-interface 22 via the message broadcaster 34.

The user-interface 22 then sends the document 30 to the file transfer module 32, which transfers the document 30 to the message transceiver 42 of the document pull module 28 via the message broadcaster 34 and the network 20. The message transceiver 42 then transfers the document 30 to the master driver 46, which employs the printer controller 48 and the printing system 50 to print the document 30, providing the printed output 52 in response thereto.

The exact details of the various messages, including the printer-querying message, the printer-availability reply message, and the request-for-document message, are application-specific and may be determined by one skilled in the art without undue experimentation to meet the needs of a given application. For example, in some applications, the printer-availability reply message may include additional information, such as the size of the printer queue, printer capabilities, GPS (Global Positioning System) coordinates of the printer, and so on. This additional information may be employed by the printer selector 40 and the user via the user-interface 22 to select the most desirable printer for a given application.

Those skilled in the art will also appreciate that the relative orientation and connections between various modules may be altered, and more or fewer modules may be included without departing from the scope of the present invention. For example, the embedded web server 54 may be implemented in a device not running on the first printer 16. Alternatively, the embedded web server 54 may be omitted, and the document pull module may run as software installed on the printer controller 48.

Figure 2:
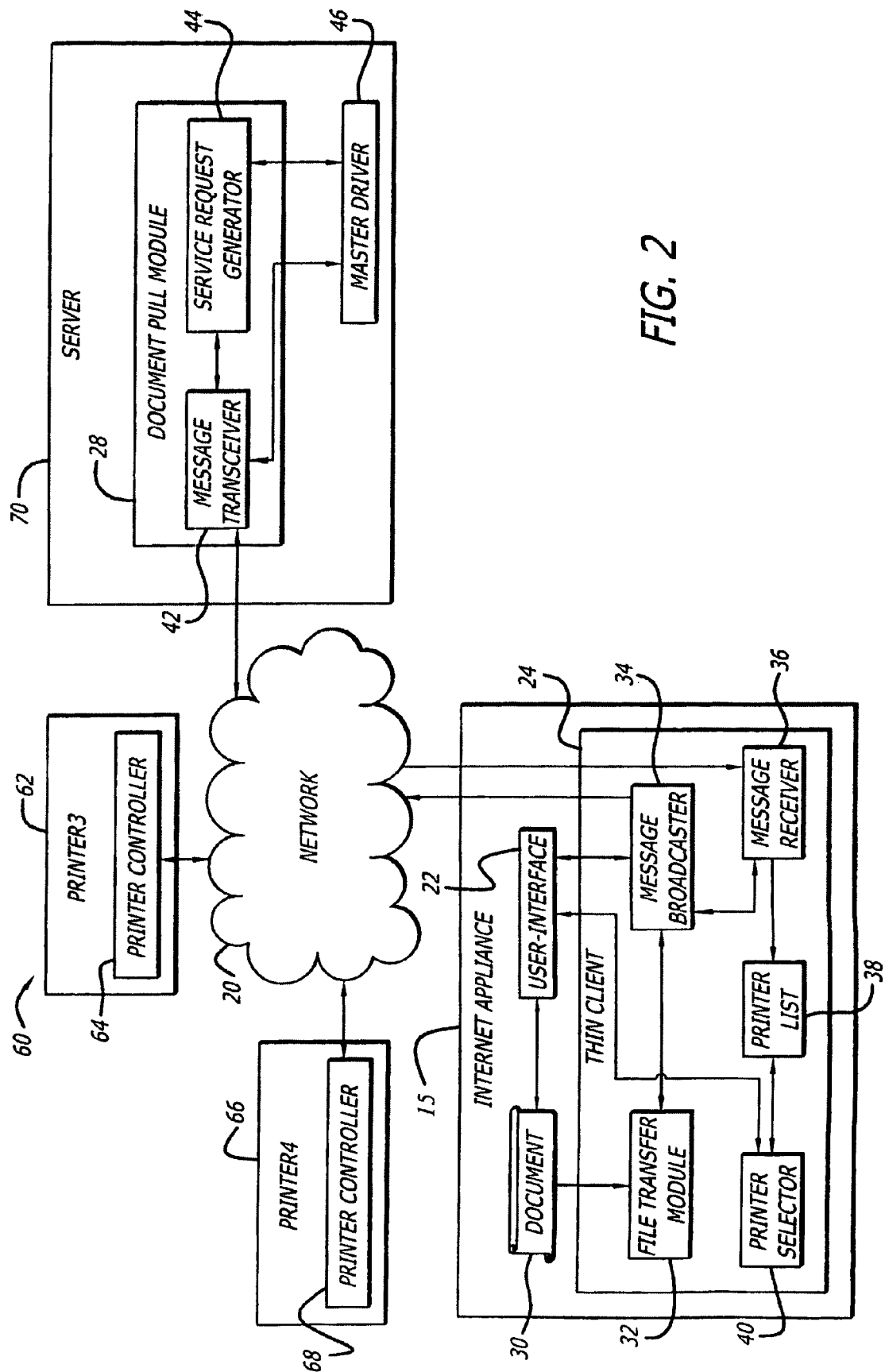
FIG. 2 is a diagram of a second exemplary network printing system, which includes components installed on network devices and includes an intermediate printing module running on a server connected to the network.

FIG. 2 is a diagram of a second exemplary network printing system 60, which includes components installed on network devices and includes an intermediate printing module running on a server 70 connected to the network. The network devices include the Internet appliance 15, a third printer 62, and a fourth printer 66. The printers 62 and 66 include corresponding printer controllers 64 and 68. The document pull module 28 and a master driver 46 run on the server 70.

In operation, the server 70 acts as an intermediate device to facilitate remote printing to network printers 62 and 66 via devices, such as the Internet appliance 15 connected to the network 20. A user of the Internet appliance 15 decides to print the document 30, activating the message broadcaster 34. The message broadcaster 34 then broadcasts a printer-querying message to the document pull module 28 running on the server 70. The document pull module 28 may then poll the various printers 62 and 66 to determine availability status, such as whether the printers 62 and 66 are connected to the network 20. Alternatively, the server 70 may maintain a database (not shown) with information about printers that are connected to the network 20. The database may be manually updated.

The information about printers connected to the network 20 is forwarded from the service request generator 44 to the Internet appliance 15 in response to the receipt of the printer-querying message by the document pull module 18. The forwarded information is sent to the Internet appliance 15 via the message transceiver 42, which is running on the document pull module 28 of the server 70.

The message receiver 36 of the Internet appliance 15 receives the printer-availability reply message(s) and forms the printer list 38 based on the printer-availability reply message(s). The user and/or printer selector 40 then selects one or more desirable printers from the printer list 38.

Subsequently, a printer-selected message is forwarded to the document pull module 28 specifying the selected printer. The document pull module 28 may then check the status of the selected printer via polling or other techniques. The document pull-module then replies with a request-for-document message, requesting the document 30 from the Internet appliance 15. The Internet appliance 15 then transfers the document 30 to the document pull module 28. Implementing a document request and pulling the document 30 from the Internet appliance 15 helps ensure that only available printers are assigned print jobs.

The document 30 is routed to an appropriate driver on the server 70 corresponding to the selected printer. The appropriate driver is implemented via the master driver 46. The master driver 46 then forwards appropriate control signals and data to the selected printer to print the document. The printer controller 64 or 68 of the selected printer processes the control signals and data corresponding to the document 30 and then prints the document in response thereto.

The printer controllers 64 and 68 are responsive to appropriate printer driver commands received from associated printer drivers. The master driver 46 includes appropriate drivers required to print via the printers 62 and 66. The master driver 46 may include a driver database (not shown) that maintains different drivers for different printers connected to the network 20. The appropriate driver is employed from the master driver 46 to control the selected printer via commands and information sent to the printer controller 64 or 68 of the selected printer via the message transceiver 42 and network 20.

Those skilled in the art will appreciate that the Internet appliance 15 may print to plural printers simultaneously or in parallel without departing from the scope of the present invention. Furthermore, the Internet appliance 15 may be replaced with another type of device, such as a desktop computer, without departing from the scope of the present invention.

Figure 3:
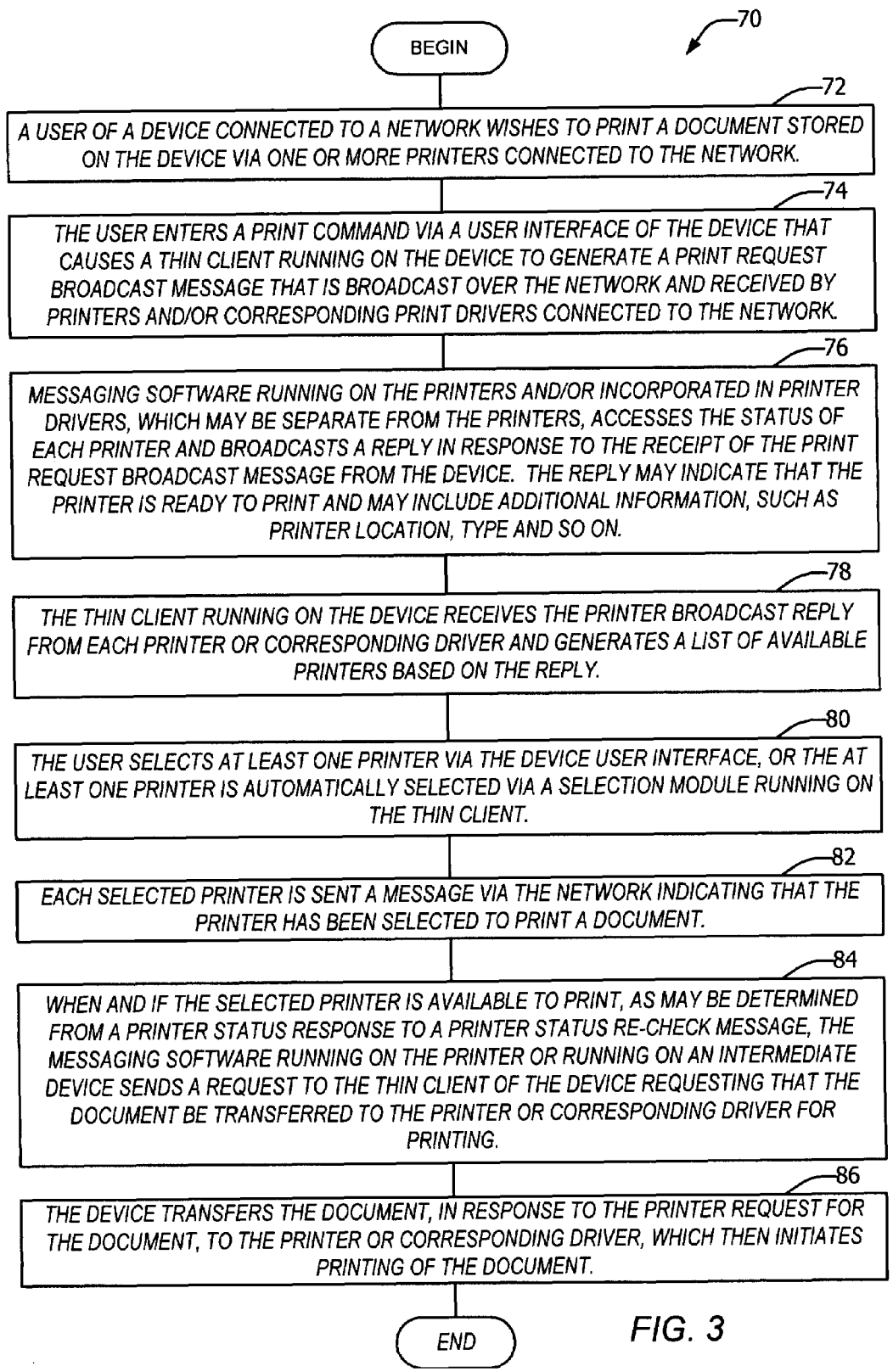
FIG. 3 is a flow diagram of a method according to the teachings of the present invention that is adapted for use with the network printing systems of FIGS. 1 and 2.

FIG. 3 is a flow diagram of a method 70 according to the teachings of the present invention and adapted for use with the network printing systems 10 and 60 of FIGS. 1 and 2, respectively. With reference to FIGS. 1, 2, and 3, in an initial step 72, a user of a device, such as the handheld computer 14 or the Internet appliance 12 wishes to print a document via one or more of the printers 16, 18, 62, and/or 66.

In a subsequent print-command step 74, the user enters a print command via the user interface 22. The print command triggers generation of a print request broadcast message called the printer-querying message. The printer-querying message is broadcast over the network 20 directly to the printers 16 and 18 or to associated printer drivers of the printers 62 and 66, such as the master driver 46 of FIG. 2.

In a subsequent printer-availability step 76, messaging software, such as the document pull module 28, determines printer availability in response to the receipt of the printer-querying message and then sends a printer-availability reply message back to the device in response thereto.

In a subsequent list-generating step 78, the thin client 24 generates a list 38 of available printers based on printer-availability reply messages received from printers connected to the network.

In a following user-selection step 80, the user selects a desirable printer from the list 38 of available printers via the user-interface 22 and/or the printer selector module 40.

In a subsequent printer-notification step 82, the thin client 24 generates and forwards printer-selected message to the selected printer. The printer-selected message indicates to the selected printer that the printer has been selected to print the document 30.

In a subsequent request-for-document step 84, messaging software 28 running on the selected printer 16, 18, 62, or 66 or running on an intermediate device, such as the server 70 of FIG. 2, sends a request (request-for-document message) to the thin client 24 requesting that the document 30 be transferred to the selected printer 16, 18, 62, or 66 or corresponding driver 46 for printing.

In a final printing step 86, the device 12 or 14 transfers the document 30 to the selected printer 16, 18, 62, or 66 or corresponding driver 46 in response to the receipt of the request-for-document message. The selected printer 16, 18, 62, or 66 then prints the document via the appropriate driver 46, and the method 70 is complete.

While the present invention has been described above with regard to selecting a single printer, in another embodiment a plurality of printers can be selected. In this embodiment, printer notification messages may be sent to one or more of the available printers.

Figure 4:
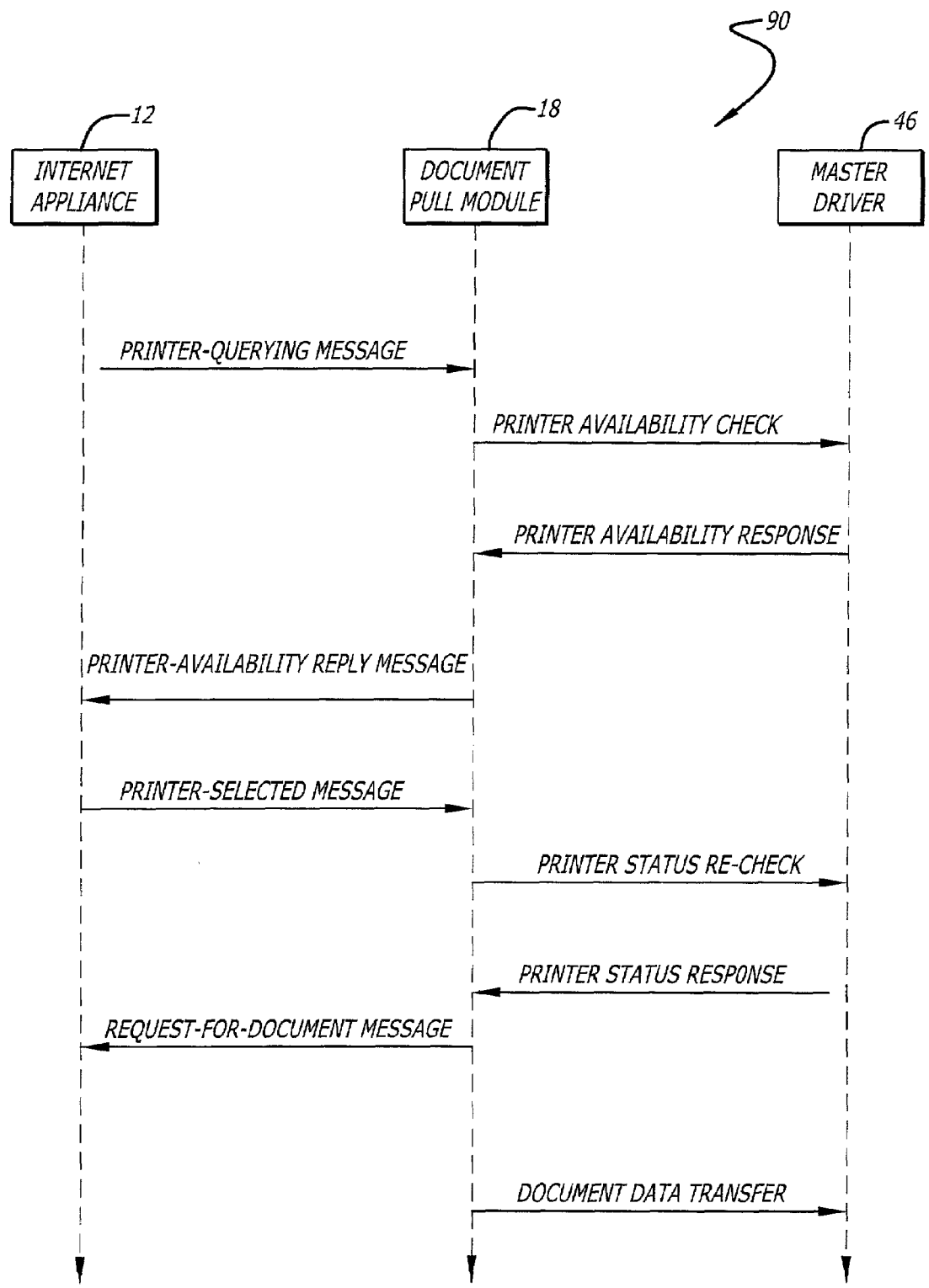
FIG. 4 is a Ping-Pong diagram summarizing messaging occurring between an Internet appliance, a document pull module, and printers or master drivers of FIGS. 1 and 2.

FIG. 4 is a Ping-Pong diagram summarizing messaging occurring between the Internet appliance 12, the document pull module 28, and printers or master drivers 46 of FIGS. 1 and 2. The document pull module 18 facilitates pulling the document from the Internet appliance 12 in response to a printer-querying message broadcast from the Internet appliance 12.

The messaging sequence 90 implements a document pull (instead of a conventional push) from the Internet appliance 12 to the master driver 46 via the document pull module 18 in response to printer-querying and printer-selected messages sent to the document pull module 18 via the Internet appliance 12. Only printers or associated printer drivers that are online, i.e., on and available to print, can pull from the Internet appliance 12. Consequently, print jobs are less likely to be placed on a queue or sent to a printer that is offline or not functioning properly. Those skilled in the art will appreciate that for some applications, the terms printer driver and printer may be employed interchangeably.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

What is claimed is:

1. A system for facilitating remote printing via a network having access to a document to be printed comprising:
    first means for receiving information with respect to the availability to print of one or more printers connected to said network, for selecting an available printer in response thereto, and for providing a printer-selected message to said selected printer indicating that said printer has been selected to print said document; and
    second means, responsive to said printer-selected message, for rechecking the availability to print of said selected printer and for pulling said document from said first means in preparation for printing via said selected printer unless said rechecking determines that said selected printer has subsequently become unavailable to print.

2. The system of claim 1 further including a device for storing said document to be printed, said device connected to said network, said network having said one or more printers connected thereto.

3. The system of claim 2 wherein said first means includes a first software module implemented as a client running on said device, said client including a first module for generating a print broadcast for querying an availability of said one or more printers.

4. The system of claim 3 wherein said second means further includes a second software module for responding to said print broadcast by generating an availability message indicating availability of said one or more printers.

5. The system of claim 3 wherein the print broadcast is broadcast to said one or more printers.

6. The system of claim 3 wherein the print broadcast is broadcast to an intermediate device different from and communicatively coupled to said one or more printers.

7. The system of claim 4 wherein said first means includes means for receiving said availability message and providing a list of available printers in response thereto.

8. The system of claim 4 wherein said second software module is installed on an intermediate device connected to said network and different from said one or more printers.

9. The system of claim 4 wherein said second software module is installed on each of said one or more printers.

10. The system of claim 4 wherein said second software module further includes said means for rechecking the availability to print of said selected printer.

11. A system for facilitating remote network printing comprising:
    a network having one or more printers and one or more devices connected thereto;
    first means installed on at least one of said one or more devices for generating a broadcast message for querying an availability to print of said one or more printers in response to a user print command;
    second means running on said network for receiving said broadcast message and providing one or more printer availability messages in response thereto;
    third means for selecting at least one available printer based on said one or more availability messages;
    fourth means for sending a notification message notifying one or more of said selected printers that a document is waiting to be printed;

means responsive to said notification message for rechecking the continued availability to print of said one or more notified printers; and fifth means for pulling said document from said at least one of said one or more devices in response to the continued availability to print of said one or more notified printers.

12. The system of claim 11 wherein said first means, third means, and said fourth means are implemented via a thin client running in said one or more devices.

13. The system of claim 12 wherein said second means and fifth means are implemented in software running on said one or more printers.

14. The system of claim 12 wherein said second means and fifth means are implemented in software installed on an intermediate device in communication with said one or more printers.

15. The system of claim 13, wherein said means for rechecking is implemented in software running on said one or more printers.

16. The system of claim 14, wherein said means for rechecking is implemented in software installed on said intermediate device.

17. A printing system, comprising:
a server configured to
receive from a document source external to the server a printer-querying message,
generate, in response to the printer-querying message, a printer availability check message to one or more printers external to the server,
receive from at least some responding ones of the printers an availability to print status,
provide the availability to print status of the responding printers to the document source,
receive from the document source a printer-selected message identifying a selected one of the responding printers in response to the availability to print status, the printer-selected message indicating to the selected printer that the printer is to print a document,
pull the document from the document source in response to the printer-selected message, and
print the document on the selected printer.

18. The printing system of claim 17, wherein the server is further configured to:
pull the document from the document source in response to the printer-selected message if a recheck of the availability to print status of the selected printer performed in response to the printer-selected message indicates that the selected printer remains available to print.

19. The printing system of claim 17, wherein the selected one of the responding printers is automatically selected by the document source in response to the availability to print status.

20. The printing system of claim 19, wherein the document source automatically selects the selected one of the responding printers based on predetermined selection criteria related to at least one of the availability to print status, a printer queue size, a printer type, printer capabilities, or a printer location.

21. A printing method, comprising:
receiving a printer-querying message from a document source external to a printer;
providing an availability to print status of the printer to the document source;
receiving from the document source, in response to the availability to print status, a printer-selected message indicating to the printer that the printer has been selected to print a document;
pulling the document from the document source to the printer in response to the printer-selected message if a recheck of the availability to print status of the printer performed in response to the printer-selected message indicates that the printer remains available to print; and
printing the document on the selected printer.

* * * * *